US012730395B2

(12) United States Patent
Mitani et al.

(10) Patent No.: US 12,730,395 B2
(45) Date of Patent: Sep. 8, 2026

(54) IMAGE FORMING APPARATUS

(71) Applicants: Yusuke Mitani, Kanagawa (JP); Shotaro Hoshi, Kanagawa (JP)

(72) Inventors: Yusuke Mitani, Kanagawa (JP); Shotaro Hoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/566,291

(22) PCT Filed: Jun. 16, 2022

(86) PCT No.: PCT/IB2022/055560
§ 371 (c)(1),
(2) Date: Dec. 1, 2023

(87) PCT Pub. No.: WO2023/007266
PCT Pub. Date: Feb. 2, 2023

(65) Prior Publication Data

US 2024/0272570 A1 Aug. 15, 2024

(30) Foreign Application Priority Data

Jul. 26, 2021 (JP) ................................ 2021-121595

(51) Int. Cl.
*G03G 15/16* (2006.01)
*G03G 15/00* (2006.01)

(52) U.S. Cl.
CPC ......... *G03G 15/168* (2013.01); *G03G 15/161* (2013.01); *G03G 15/1675* (2013.01);
(Continued)

(58) Field of Classification Search
CPC .. G03G 15/50; G03G 15/161; G03G 15/1675; G03G 15/168; G03G 2215/1652; G03G 2215/1661
See application file for complete search history.

(56) References Cited

U.S. PATENT DOCUMENTS

2005/0100361 A1* 5/2005 Tanaka ................ G03G 21/007
399/101
2006/0067729 A1* 3/2006 Ikeda ................ G03G 15/1675
399/101

(Continued)

FOREIGN PATENT DOCUMENTS

CN 1755547 A 4/2006
CN 105319897 A 2/2016

(Continued)

OTHER PUBLICATIONS

International Search Report and Written Opinion issued on Sep. 5, 2022 in PCT/IB2022/055560 filed on Jun. 16, 2022.

(Continued)

*Primary Examiner* — Carla J Therrien
(74) *Attorney, Agent, or Firm* — Harness, Dickey & Pierce, P.L.C.

(57) ABSTRACT

An image forming apparatus includes an image bearer, a transfer member, a cleaning member, and a control unit. The transfer member contacts the image bearer to form a transfer nip and transfer a toner image on the image bearer to a recording medium at the transfer nip. The cleaning member cleans a surface of the image bearer. The control unit executes a cleaning operation of moving an extraneous matter adhering to the transfer member to the image bearer to clean the transfer member. The control unit executes the cleaning operation after a toner image pattern that is not transferred to the recording medium passes through the transfer nip and before the recording medium enters the transfer nip.

18 Claims, 6 Drawing Sheets

(52) U.S. Cl.
CPC ..... *G03G 15/50* (2013.01); *G03G 2215/1652* (2013.01); *G03G 2215/1661* (2013.01)

(56) References Cited

U.S. PATENT DOCUMENTS

| | | | | |
|---|---|---|---|---|
| 2007/0242965 | A1 | 10/2007 | Akamatsu | |
| 2011/0013959 | A1* | 1/2011 | Thayer | G03G 21/0005 399/346 |
| 2012/0148286 | A1* | 6/2012 | Hirai | G03G 15/161 399/101 |
| 2013/0051832 | A1* | 2/2013 | Aiba | G03G 15/168 399/101 |
| 2015/0037054 | A1 | 2/2015 | Nagata et al. | |
| 2015/0110510 | A1 | 4/2015 | Ishikawa | |
| 2015/0117884 | A1 | 4/2015 | Sugiyama et al. | |
| 2015/0268591 | A1 | 9/2015 | Fujita et al. | |
| 2015/0346652 | A1 | 12/2015 | Ohmura | |
| 2015/0378284 | A1 | 12/2015 | Wada et al. | |
| 2016/0033915 | A1 | 2/2016 | Kumagai et al. | |
| 2016/0041509 | A1 | 2/2016 | Sekiguchi et al. | |
| 2016/0209786 | A1* | 7/2016 | Kojima | G03G 15/1605 |
| 2017/0185022 | A1* | 6/2017 | Tsuda | G03G 15/5058 |
| 2022/0121138 | A1 | 4/2022 | Yamada et al. | |

FOREIGN PATENT DOCUMENTS

| | | | |
|---|---|---|---|
| CN | 112782951 | A | 5/2021 |
| EP | 1643318 | A1 | 4/2006 |
| JP | 2007-286176 | A | 11/2007 |
| JP | 2014-029385 | A | 2/2014 |
| JP | 2018-120183 | A | 8/2018 |

OTHER PUBLICATIONS

Chinese Office Action dated Jan. 30, 2026 for corresponding Chinese Application No. 202280047632.6.

* cited by examiner

IMAGE FORMING APPARATUS

CROSS-REFERENCE TO RELATED APPLICATIONS

This application is a national phase under 35 U.S.C. § 371 of PCT International Application No. PCT/IB2022/055560 which has an International filing date of Jun. 16, 2022, which claims priority to Japanese Application No. 2021-121595, filed Jul. 26, 2021, the entire contents of each of which are hereby incorporated by reference.

TECHNICAL FIELD

Embodiments of the present disclosure relate to an image forming apparatus.

BACKGROUND ART

As known in the art, an image forming apparatus includes an image bearer, a transfer member that contacts the image bearer to form a transfer nip and transfer a toner image on the image bearer onto a recording medium at the transfer nip, and a cleaning member that cleans a surface of the image bearer.

Patent Literature (PTL) 1 discloses, as an example of the image forming apparatus described above, an image forming apparatus that forms a toner image pattern to remove filming on an intermediate transfer belt as the image bearer and causes the toner image pattern to pass through the transfer nip and enter a contact portion of the cleaning member in contact with the image bearer by movement of the intermediate transfer belt.

CITATION LIST

Patent Literature

[PTL 1] Japanese Unexamined Patent Application Publication No. 2018-120183

SUMMARY OF INVENTION

Technical Problem

However, the back side of the recording medium may be contaminated.

Solution to Problem

An image forming apparatus includes an image bearer, a transfer member, a cleaning member, and a control unit. The transfer member contacts the image bearer to form a transfer nip and transfer a toner image on the image bearer to a recording medium at the transfer nip. The cleaning member cleans a surface of the image bearer. The control unit executes a cleaning operation of moving an extraneous matter adhering to the transfer member to the image bearer to clean the transfer member. The control unit executes the cleaning operation after a toner image pattern that is not transferred to the recording medium passes through the transfer nip and before the recording medium enters the transfer nip.

An image forming apparatus includes an image bearer, a transfer member, a cleaning member, and a control unit. The transfer member contacts the image bearer to form a transfer nip and transfer a toner image on the image bearer to a recording medium at the transfer nip. The cleaning member cleans a surface of the image bearer. The control unit executes a cleaning operation of moving an extraneous matter adhering to the transfer member to the image bearer to clean the transfer member. The control unit causes a toner image pattern that is not transferred to the recording medium to pass through the transfer nip during the cleaning operation.

An image forming apparatus includes an image bearer, a transfer member, a cleaning member, and a control unit. The transfer member contacts the image bearer to form a transfer nip and transfer a toner image on the image bearer to a recording medium at the transfer nip. The cleaning member cleans a surface of the image bearer. The control unit executes a cleaning operation of moving an extraneous matter adhering to the transfer member to the image bearer to clean the transfer member. The control unit completes the cleaning operation before a toner image pattern that is not transferred to the recording medium reaches the transfer nip.

An image forming apparatus includes an image bearer, a transfer member, a cleaning member, and a control unit. The transfer member contacts the image bearer to form a transfer nip and transfer a toner image on the image bearer to a recording medium at the transfer nip. The cleaning member cleans a surface of the image bearer. The control unit executes an image forming operation of forming an image on the recording medium. The image forming operation includes: a pre-sheet-passage cleaning operation of moving an extraneous matter adhering to the transfer member to the image bearer to clean the transfer member before a first recording medium reaches the transfer nip, and a post-sheet-passage cleaning operation of moving the extraneous matter adhering to the transfer member to the image bearer to clean the transfer member after a last recording medium passes through the transfer nip. The control unit causes a toner image pattern that is not transferred to the recording medium to pass through the transfer nip at at least one of following points in time 1 to 4 during the image forming operation: the point in time 1 being before the pre-sheet-passage cleaning operation, the point in time 2 being during the pre-sheet-passage cleaning operation, the point in time 3 being during the post-sheet-passage cleaning operation, and the point in time 4 being after the post-sheet-passage cleaning operation.

Advantageous Effects of Invention

Accordingly, the contamination on the back side of the recording medium is prevented.

BRIEF DESCRIPTION OF DRAWINGS

A more complete appreciation of the embodiments and many of the attendant advantages and features thereof can be readily obtained and understood from the following detailed description with reference to the accompanying drawings.

Figure 1:
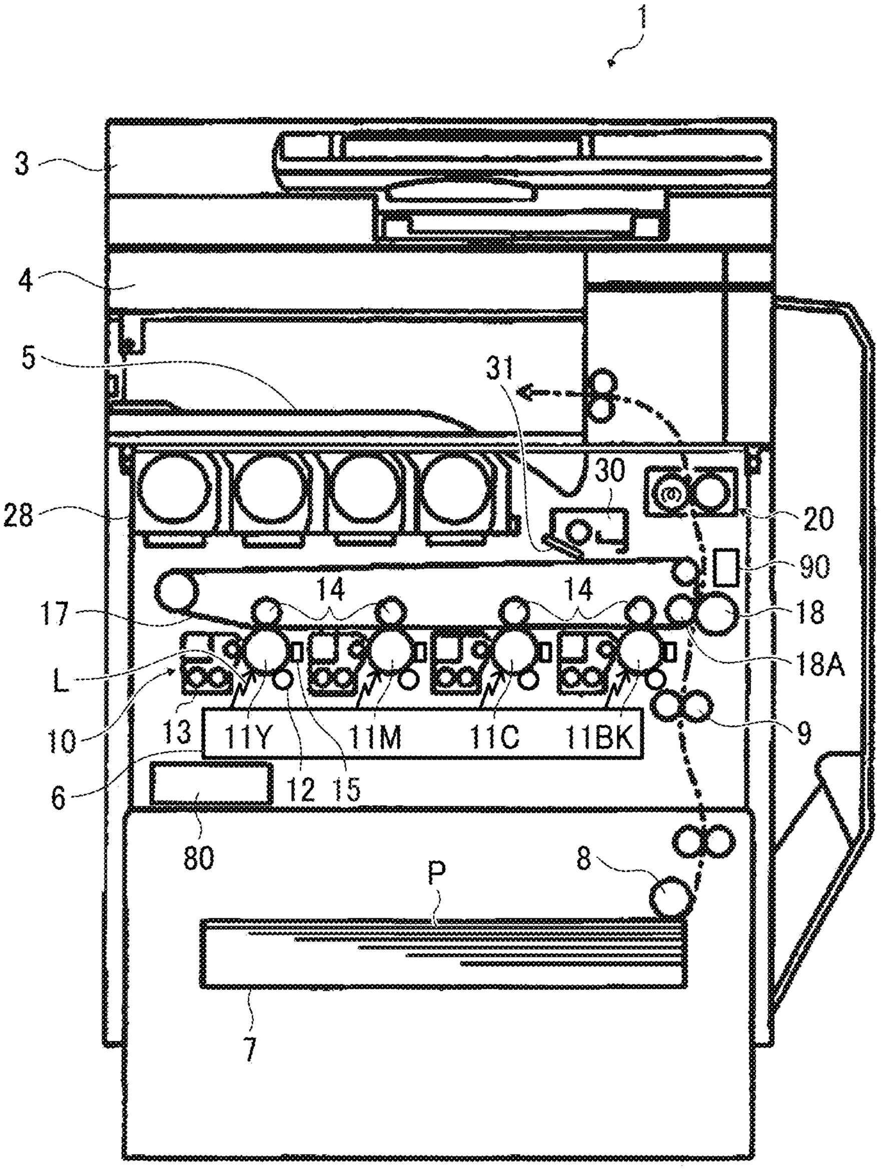
FIG. 1 is a schematic view of a tandem color copier as an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. Identical reference numerals are assigned to identical components or equivalents and redundant descriptions of those components may be simplified or omitted. Note that, in the following description, suffixes Y, M, C, and BK denote colors of yellow, magenta, cyan, and black, respectively. To simplify the description, these suffixes are omitted unless necessary.

FIG. 1 is a schematic view of a tandem color copier, which may be referred to simply as a copier in the following description, as an image forming apparatus according to the present embodiment.

In FIG. 1, a tandem color copier 1, which may be referred to simply as a copier 1 in the following description, as an image forming apparatus includes a document conveying unit 3 that conveys a document to a document reading unit 4, the document reading unit 4 that reads image information of the document, an output tray 5 on which output images lie stacked, and a sheet feeding unit 7 that accommodates sheets P as recording media.

The copier 1 further includes a registration roller pair 9 (as a timing roller pair) that adjusts the time when to convey the sheet P and an image forming unit 10 that forms toner images of yellow, magenta, cyan, and black. The image forming unit 10 includes, e.g., photoconductive drums 11Y, 11M, 11C, and 11BK as latent image bearers on which the toner images of yellow, magenta, cyan, and black are formed, respectively. The image forming unit 10 further includes a writing unit (exposure unit) 6 and, around each of the photoconductive drums 11Y, 11M, 11C, and 11BK, a charging device 12 and a developing device 13, for example. Specifically, the charging device 12 uniformly charges the surface of the corresponding one of the photoconductive drums 11Y, 11M, 11C, and 11BK. The writing unit (exposure unit) 6 emits laser light according to input image information and writes electrostatic latent images on the photoconductive drums 11Y, 11M, 11C, and 11BK. The developing device 13 develops the electrostatic latent image written on the corresponding one of the photoconductive drums 11Y, 11M, 11C, and 11BK. Primary-transfer bias rollers 14 are also disposed to transfer the toner images formed on the photoconductive drums 11Y, 11M, 11C, and 11BK onto an intermediate transfer belt 17 so that the toner images of yellow, magenta, cyan, and black are superimposed one atop another on the intermediate transfer belt 17.

The copier 1 further includes the intermediate transfer belt 17 as an image bearer on which the toner images of a plurality of colors are transferred and overlapped and a secondary transfer roller 18 as a transfer member that transfers a color toner image on the intermediate transfer belt 17 onto the sheet P. The copier 1 further includes a fixing device 20 that fixes an unfixed image on the sheet P and a toner container 28 that contains toner for each color of yellow, cyan, magenta, and black to be supplied to the developing device 13. The copier 1 further includes a belt cleaning device 30 that removes toner (untransferred toner) adhering to an outer circumferential surface of the intermediate transfer belt 17. The copier 1 further includes a waste toner collecting container 80 that collects, as waste toner, the untransferred toner removed by the belt cleaning device 30, for example. The copier 1 further includes a control unit 90 (e.g., a processor) that includes a central processing unit (CPU) provided with a random access memory (RAM) and a read only memory (ROM), for example.

Now, a description is given of a regular color image forming operation performed by the copier 1 as an image forming apparatus.

The document conveying unit 3 conveys a document from a document tray with conveyance rollers to load the document on a platen of the document reading unit 4. The document reading unit 4 optically reads the image information of the document loaded on the platen.

Specifically, the document reading unit 4 scans an image of the document on the platen while irradiating the image with light emitted from an illumination lamp and forms an image of light reflected from the document on a color sensor via a mirror group and a lens. The color sensor reads the color image information of the document for each of decomposed light colors of red, green, and blue (RGB) and converts the color image information into electrical image signals. An image processing unit performs processing such as color conversion, color calibration, and spatial frequency correction based on the electrical image signals of the decomposed light colors of RGB to acquire color image information of yellow, magenta, cyan, and black.

The image information for each color of yellow, magenta, cyan, and black is sent to the writing unit 6. The writing unit 6 emits laser light L toward the surface of the photoconductive drums 11Y, 11M, 11C, and 11BK according to the image information for each color of yellow, magenta, cyan, and black, respectively.

Each of the four photoconductive drums 11Y, 11M, 11C, and 11BK rotates clockwise in FIG. 1. The surface of each of the photoconductive drums 11Y, 11M, 11C, and 11BK is uniformly charged at a position at which the surface of each of the photoconductive drums 11Y, 11M, 11C, and 11BK faces the charging device 12 (in a charging process). Thus, a charging potential is formed on the surface of each of the photoconductive drums 11Y, 11M, 11C, and 11BK. Thereafter, the charged surface of each of the photoconductive drums 11Y, 11M, 11C, and 11BK reaches an irradiation position to be irradiated with the corresponding laser light.

Four light sources of the writing unit 6 emit laser light according to the image signals for the respective colors of yellow, cyan, magenta, and black. The laser light passes through a separate optical path for each color component of yellow, magenta, cyan, and black (in an exposure process).

The laser light corresponding to the yellow component is emitted to the surface of the leftmost photoconductive drum 11Y in FIG. 1. At this time, the laser light corresponding to the yellow component is directed by a polygon mirror rotating at high speed in an axial direction of the photoconductive drum 11Y (i.e., a main scanning direction). Thus, an electrostatic latent image corresponding to the yellow component is formed on the surface of the photoconductive drum 11Y charged by the charging device 12.

Similarly, the laser light corresponding to the magenta component is emitted to the surface of the second photoconductive drum 11M from the left in FIG. 1. Thus, an electrostatic latent image corresponding to the magenta component is formed. The laser light corresponding to the cyan component is emitted to the surface of the third photoconductive drum 11C from the left in FIG. 1. Thus, an electrostatic latent image corresponding to the cyan component is formed. The laser light corresponding to the black component is emitted to the surface of the fourth photoconductive drum 11BK from the left in FIG. 1. Thus, an electrostatic latent image corresponding to the black component is formed.

Thereafter, the surface bearing the electrostatic latent image for the corresponding color of each of the photoconductive drums 11Y, 11M, 11C, and 11BK reaches a position at which the surface bearing the electrostatic latent image faces the developing device 13. The developing device 13 supplies toner of the corresponding color onto the corresponding one of the photoconductive drums 11Y, 11M, 11C, and 11BK to develop the electrostatic latent image formed on the corresponding one of the photoconductive drums 11Y, 11M, 11C, and 11BK (in a developing process).

The surface of each of the photoconductive drums 11Y, 11M, 11C, and 11BK after the developing process reaches a position at which the surface after the developing process faces the intermediate transfer belt 17 as an image bearer. Each of the primary-transfer bias rollers 14 is disposed at the position at which the surface after the developing process faces the intermediate transfer belt 17, so as to contact an inner circumferential surface of the intermediate transfer belt 17. At the positions of the primary-transfer bias rollers 14, the toner images of yellow, magenta, cyan, and black formed on the photoconductive drums 11Y, 11M, 11C, and 11BK, respectively, are transferred onto the intermediate transfer belt 17 successively so that the toner images of yellow, magenta, cyan, and black are superimposed one atop another on the intermediate transfer belt 17 (in a primary transfer process).

The surface of each of the photoconductive drums 11Y, 11M, 11C, and 11BK after the primary transfer process reaches a position at which the surface after the primary transfer process faces a cleaning unit 15. The cleaning unit 15 removes and collects untransferred toner remaining on the corresponding one of the photoconductive drums 11Y, 11M, 11C, and 11BK (in a cleaning process). The untransferred toner removed and collected by the cleaning unit 15 is conveyed to and collected in the waste toner collecting container 80 as waste toner via a conveyance passage. The surface of each of the photoconductive drums 11Y, 11M, 11C, and 11BK after the cleaning process passes by a charge neutralizing unit. Thus, a series of image forming processes performed on the photoconductive drums 11Y, 11M, 11C, and 11BK is completed.

On the other hand, the intermediate transfer belt 17 (as an image bearer) bearing a color toner image formed of the superimposed toner images of yellow, magenta, cyan, and black primarily transferred from the respective photoconductive drums 11Y, 11M, 11C, and 11BK travels counterclockwise in FIG. 1 and reaches a position at which the color toner image faces the secondary transfer roller 18. The secondary transfer roller 18 contacts the intermediate transfer belt 17 to form a secondary transfer nip as a transfer nip. At the secondary transfer nip, the color toner image borne on the intermediate transfer belt 17 is secondarily transferred onto the sheet P (in a secondary transfer process).

A secondary transfer bias is applied to an opposed roller 18A facing the secondary transfer roller 18 via the intermediate transfer belt 17. The secondary transfer roller 18 is electrically grounded. When the color toner image on the intermediate transfer belt 17 is secondarily transferred onto the sheet P, a transfer bias having a negative polarity, which is a normal charging polarity of the toner, is applied to the opposed roller 18A so that the normally charged toner having the negative polarity on the intermediate transfer belt 17 is repulsively transferred onto the sheet P.

The outer circumferential surface of the intermediate transfer belt 17 after the secondary transfer process reaches a position of the belt cleaning device 30. The belt cleaning device 30 includes a cleaning blade 31 as a cleaning member. The cleaning blade 31 removes the toner (untransferred toner) adhering onto the intermediate transfer belt 17. The toner removed by the cleaning blade 31 is conveyed to and collected in the waste toner collecting container 80 as waste toner via a conveyance passage.

The sheet P is conveyed from the sheet feeding unit 7 via, e.g., the registration roller pair 9 to the secondary transfer nip between the intermediate transfer belt 17 and the secondary transfer roller 18.

Specifically, the sheet P fed by a sheet feeding roller 8 from the sheet feeding unit 7 that accommodates the sheets P passes through a conveyance guide and is directed to the registration roller pair 9. The sheet P reaching the registration roller pair 9 is conveyed toward the secondary transfer nip such that the sheet P meets the color toner image on the intermediate transfer belt 17 at the secondary transfer nip.

The sheet P on which the full-color image (i.e., the color toner image) has been transferred in the secondary transfer process is then guided to the fixing device 20. The fixing device 20 fixes the full-color image onto the sheet P at a nip between a fixing roller and a pressure roller. The sheet P after the fixing process is ejected by an output roller pair as an output image to an outside of an apparatus body of the copier 1. Thus, the sheets P lie stacked on the output tray 5. Accordingly, a series of image forming processes is completed.

A mother component of the toner, silica or titanium oxide added to the toner, and other so-called external additives of the toner are transferred from the photoconductive drum 11 to the intermediate transfer belt 17. The external additives of the toner transferred to the intermediate transfer belt 17 may adhere to the intermediate transfer belt 17 and cause filming on the intermediate transfer belt 17. In a case where the surface of the photoconductive drum 11 is provided with a lubricant application unit that applies a lubricant, various components included in the lubricant are also transferred from the photoconductive drum 11 to the intermediate transfer belt 17 in addition to the external additives of the toner. The external additives of the toner and the lubricant may interact with each other and worsen the filming on the intermediate transfer belt 17. Further, paper dust may be transferred from the sheet P to the intermediate transfer belt 17 at the secondary transfer nip and may adhere to the intermediate transfer belt 17, resulting in paper dust filming.

Such filming on the intermediate transfer belt 17 is caused by filming substances, such as the external additives of the toner including silica and various components included in the lubricant, adhering to the intermediate transfer belt 17 when the intermediate transfer belt 17 receives external pressure (mainly contact pressure from the photoconductive drum 11). The toner fails to be placed on the filming on the intermediate transfer belt 17 when a full solid image or a halftone image is output. As a result, defective images such as an image including white spots may be formed.

The filming is scraped off by the toner staying at a rubbing area, which may be referred to as a cleaning area in the following description, between the cleaning blade 31 and the outer circumferential surface of the intermediate transfer belt 17. Thus, the filming is removed from the outer circumferential surface of the intermediate transfer belt 17.

For this reason, the copier 1 forms a scraping toner pattern on the intermediate transfer belt 17 at a given point in time to remove the filming from the intermediate transfer belt 17 at a given point in time. The scraping toner pattern is input to the cleaning blade 31 so that a sufficient amount of toner stays at the cleaning area.

Figure 2:
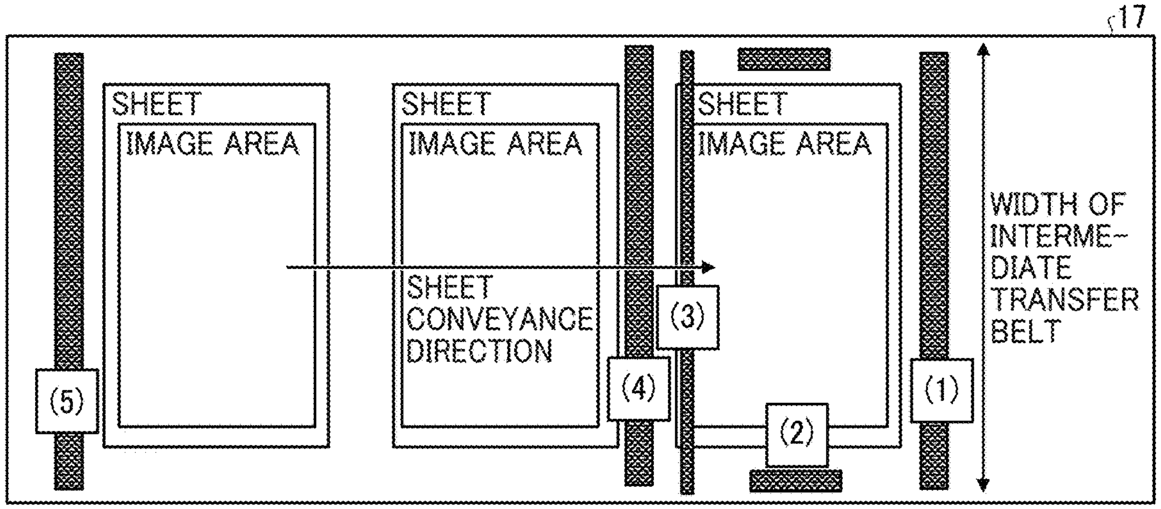
FIG. 2 is a diagram illustrating examples of position at which a scraping toner pattern is formed on an intermediate transfer belt.

FIG. 2 is a diagram illustrating examples of position at which the scraping toner pattern is formed on the intermediate transfer belt 17.

FIG. 2 illustrates a case where three sheets are continuously conveyed in a sheet conveyance direction and printed in the regular image forming operation. As illustrated in FIG. 2, the examples of the position at which the scraping toner pattern is formed include, but are not limited to: (1) a position before the first sheet to the secondary transfer nip, (2) a position outside the width of a sheet that passes through the secondary transfer nip, (3) a position in a non-image forming area at a trailing end of a sheet that passes through the secondary transfer nip, (4) a position between sheets, and (5) a position after the last sheet passes through the secondary transfer nip.

In another embodiment, the position (3) may be a position in a non-image forming area at a leading end of a sheet that passes through the secondary transfer nip. When the scraping toner pattern on the intermediate transfer belt 17 passes through the secondary transfer nip, a positive bias (i.e., a bias having a positive polarity) is applied to the opposed roller 18A. The positive bias applied to the opposed roller 18A electrostatically attracts the scraping toner pattern to the intermediate transfer belt 17, thus preventing the scraping toner pattern from being transferred to the secondary transfer roller 18 or the sheet P.

To form the scraping toner pattern, for example, a filming index value indicating a filming amount on the outer circumferential surface of the intermediate transfer belt 17 is measured. When the filming index value exceeds a given threshold, the scraping toner pattern is formed. For example, an image forming mode may be used to calculate the filming index value.

Filming may be worse in a color image mode than in a monochrome image mode. The internal temperature of the copier 1 tends to be higher in the color image mode than in the monochrome image mode because the fixing temperature is set higher and the number of operating motors is greater in the color image mode. An increase in the internal temperature may also increase the stick-slip amount of the cleaning blade 31 and worsen the filming. In addition, in a case where the surface of the photoconductive drum 11 is provided with a lubricant application unit that applies a lubricant, the amount of the lubricant, which is a component of the filming substances adhering to the intermediate transfer belt 17, is greater in the color image mode than in the monochrome image mode. For this reason, the filming may be worse in the color image mode than in the monochrome image mode.

To prevent such a situation, for example, an index value B of the color image mode is set to a value higher than an index value A of the monochrome image mode ($A<B$). Then, during the image forming operation, it is determined whether the mode is the monochrome image mode or the color image mode. The index value A is added in the monochrome image mode; whereas the index value B is added in the color image mode. When the cumulative filming index value exceeds a threshold, the scraping toner pattern is formed.

For example, when images are formed in the color image mode more than in the monochrome image mode, the filming is more likely to be worse than in the monochrome image mode as described above. However, when images are formed in the color image mode more than in the monochrome image mode, the scraping toner pattern is formed earlier than in the monochrome image mode because the filming index value exceeds the threshold with a relatively small number of printed sheets. By contrast, when images are formed in the monochrome image mode more than in the color image mode, the filming is less likely to be worse than in the color image mode. In other words, when images are formed in the monochrome image mode more than in the color image mode, the scraping toner pattern is formed later than in the color image mode because the filming index value exceeds the threshold with a greater number of printed sheets in the monochrome image mode than in the color image mode.

Since the scraping toner pattern is formed based on the image mode, the scraping toner pattern is formed at an appropriate point in time, thus favorably preventing wasteful toner consumption and the filming from being worse.

In another embodiment, the scraping toner pattern may be formed based on a traveling distance of the intermediate transfer belt 17. After the scraping toner pattern is formed, the traveling distance of the intermediate transfer belt 17 is counted. When the traveling distance exceeds a threshold, another scraping toner pattern is formed. In yet another embodiment, the filming index value may be calculated based on, e.g., the traveling distance of the intermediate transfer belt 17, the image forming mode, the apparatus environment, and the image area rate. The scraping toner pattern may be formed when the filming index value exceeds a threshold.

Alternatively, for example, the scraping toner pattern may be formed at a given point in time; whereas the amount of toner of the scraping toner pattern may be determined based on the image forming mode or the traveling distance of the intermediate transfer belt 17. In this case, similarly to the cases described above, the filming index value is calculated based on, e.g., the image forming mode or the traveling distance of the intermediate transfer belt 17. The amount of toner of the scraping toner pattern is determined based on the filming index value. As one example, the index value of the color image mode may be set to a value greater than the index value of the monochrome image mode. It is determined whether the image forming operation is performed in the monochrome image mode or the color image mode and the index value is added. As another example, the index value may be calculated and added based on the traveling distance of the intermediate transfer belt 17 from the previous formation of the scraping toner pattern to the current formation of the scraping toner pattern. When the filming index value thus obtained is relatively large, the amount of toner of the scraping toner pattern is increased. By contrast, when the filming index value is relatively small, the amount of toner of the scraping toner pattern is decreased. Accordingly, wasteful toner consumption is prevented while the filming is removed from the intermediate transfer belt 17.

The amount of the scraping toner pattern adhering to the intermediate transfer belt 17 may be varied in a width direction of the intermediate transfer belt 17.

Figure 3A:
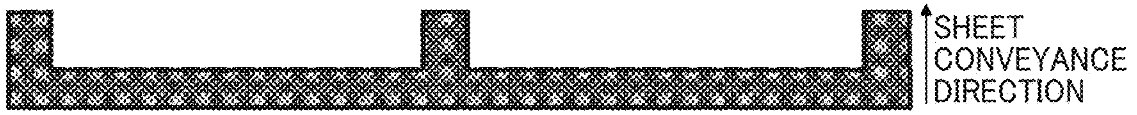
FIGS. 3A and 3B are diagrams illustrating an example in which an amount of toner of the scraping toner pattern input to a cleaning blade is varied in a width direction of the intermediate transfer belt.
Figure 3B:
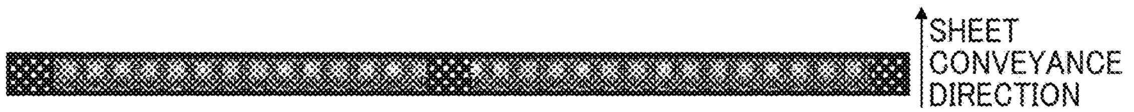

FIGS. 3A and 3B are diagrams illustrating an example in which the amount of toner of the scraping toner pattern input to the cleaning blade 31 is varied in the width direction of the intermediate transfer belt 17.

FIGS. 3A and 3B illustrate an example in which the amount of toner input to the cleaning blade 31 is increased at the center and opposed ends in the width direction of the intermediate transfer belt 17. Specifically, FIG. 3A illustrates an example in which the scraping toner pattern is formed to be longer in the traveling direction of the intermediate transfer belt 17 at the center and opposed ends in the width direction of the intermediate transfer belt 17 than at other positions, to increase the amount of toner input to the cleaning blade 31 at the center and opposed ends in the width direction of the intermediate transfer belt 17. FIG. 3B illustrates an example in which the scraping toner pattern is formed having a greater amount of toner at the center and opposed ends in the width direction of the intermediate transfer belt 17 than at other positions, to increase the amount of toner input to the cleaning blade 31 at the center and opposed ends in the width direction of the intermediate transfer belt 17.

For example, an optical sensor may be disposed facing the intermediate transfer belt 17 to detect a scraping toner pattern for image adjustment such as a gradation pattern formed on the intermediate transfer belt 17. Based on the result of detection, a developing bias may be adjusted. In a case where the filming exists in a detection area on the intermediate transfer belt 17 to be detected by the optical sensor, the optical sensor may fail to favorably detect the scraping toner pattern for image adjustment because the glossiness of the filming portion is different from that of other portions of the intermediate transfer belt 17. To prevent such a situation, the scraping toner pattern is formed such that a portion that faces the optical sensor has an increased amount of toner input to the cleaning blade 31 in the width direction of the intermediate transfer belt 17. Accordingly, the filming is removed from the intermediate transfer belt 17 and the detection accuracy of the optical sensor is enhanced.

Alternatively, the cumulative image area rate may be calculated at each position in the width direction of the intermediate transfer belt 17 to increase the amount of toner input to the cleaning area at a position with a lower cumulative image area rate than another position in the width direction of the intermediate transfer belt 17. Thus, the scraping toner pattern may be formed. Accordingly, the toner staying at the cleaning blade 31 removes the filming uniformly in the width direction of the intermediate transfer belt 17.

Figure 4:
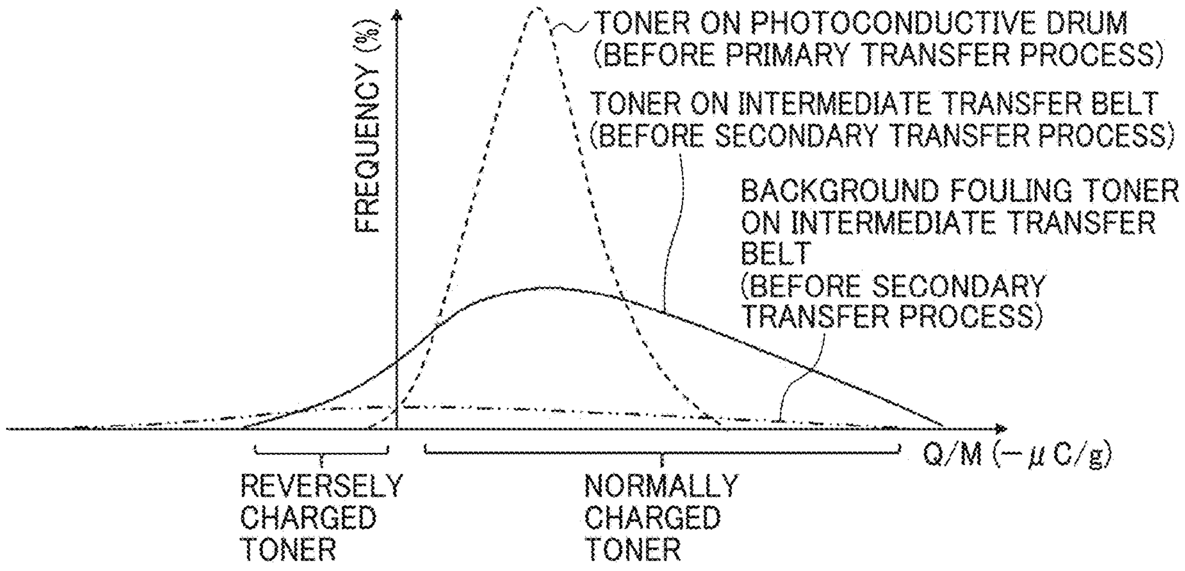
FIG. 4 is a graph illustrating a charge distribution of toner before a primary transfer process, a charge distribution of toner before a secondary transfer process, and a charged amount distribution of background fouling toner on the intermediate transfer belt.

FIG. 4 is a graph illustrating a charge distribution of toner before the primary transfer process, a charge distribution of toner before the secondary transfer process, and a charged amount distribution of background fouling toner on the intermediate transfer belt 17.

The normal charging polarity of the toner mounted on the copier 1 is negative. In FIG. 4, the broken line indicates the charge distribution of toner on the photoconductive drum 11 before the primary transfer process; whereas the solid line indicates the charge distribution of toner on the intermediate transfer belt 17 before the secondary transfer process. In FIG. 4, the two-dot chain line indicates the charged amount distribution of the background fouling toner on the intermediate transfer belt 17.

A charge distribution of toner of the scraping toner pattern on the photoconductive drum 11 (before the primary transfer process) and a charge distribution of toner of the scraping toner pattern on the intermediate transfer belt 17 (before the secondary transfer process) are substantially the same as the charge distribution of toner on the photoconductive drum 11 (before the primary transfer process) and the charge distribution of toner on the intermediate transfer belt 17 (before the secondary transfer process) illustrated in FIG. 4, respectively. As illustrated in FIG. 4, the charge distribution of toner on the photoconductive drum 11 is sharp with a narrow full width at half maximum; whereas the charge distribution of toner on the intermediate transfer belt 17 is broad with a wide full width at half maximum due to the influence of the hazard of discharging in the primary transfer process. The amount of reversely charged toner, which is charged to a polarity (positive polarity) opposite the normal charging polarity (negative polarity) of the toner is greater on the intermediate transfer belt 17 than on the photoconductive drum 11. Background fouling toner is continuously supplied from the developing device 13 during the operation of the copier 1. The total amount of the background fouling toner is smaller than the amount of toner used at the time of image formation. However, the background fouling toner exhibits a charged amount distribution with a very wide full width at half maximum including negative charge and positive charge.

As described above, when the scraping toner pattern passes through the secondary transfer nip, the positive bias is applied to the opposed roller 18A to electrostatically attract the toner having a negative polarity to the intermediate transfer belt 17, thus preventing the toner from moving to the secondary transfer roller 18. However, at this time, the reversely charged toner having the positive polarity of the scraping toner pattern and the background fouling toner having the positive polarity are electrostatically moved to the secondary transfer roller 18. As a result, the secondary transfer roller 18 is contaminated by the toner. A surface layer of the secondary transfer roller 18 is made of a foaming agent such as sponge and contains many fine cells. For this reason, the normally charged toner having the negative polarity of the scraping toner pattern is scraped off by the secondary transfer roller 18 at the secondary transfer nip and adheres to the secondary transfer roller 18.

When the secondary transfer roller 18 is thus contaminated by the toner, a margin for back contamination, which refers to contamination of the back side of the sheet P, is reduced. As a result, when the toner image is transferred onto the sheet P, the toner may adhere to the back side of the sheet P and cause the back contamination.

One approach to such back contamination involves providing a contact-separation mechanism that brings the secondary transfer roller 18 into contact with the intermediate transfer belt 17 and separates the secondary transfer roller 18 from the intermediate transfer belt 17 and causing the contact-separation mechanism to separate the secondary transfer roller 18 from the intermediate transfer belt 17 to input the scraping toner pattern into the cleaning blade 31. However, the contact-separation mechanism thus provided increases the number of components of the copier 1, which may lead to an increase in cost of the copier 1 and an increase in size of the copier 1. In addition, the secondary transfer roller 18 is to be separated in consideration of mechanical and electrical tolerances. For this reason, the contact and separation operation of the secondary transfer roller 18 may not be performed in time in a case where the scraping toner pattern is formed at a position in the non-image forming area at the leading or trailing end of the sheet that passes through the secondary transfer nip as illustrated in FIG. 2. In addition, in the case of (4) illustrated in FIG. 2 where the scraping toner pattern is formed between sheets, the contact and separation operation of the secondary transfer roller 18 may not be performed in time unless the sheet interval is increased. To address such a situation, the copier 1 executes a cleaning operation of cleaning the secondary transfer roller 18. The copier 1 executes the cleaning operation to move, to the intermediate transfer belt 17, the reversely charged toner electrostatically adhering to the secondary transfer roller 18 when the scraping toner pattern passes through the secondary transfer nip and the normally charged toner scraped off by the secondary transfer roller 18 and mechanically adhering to the secondary transfer roller 18.

Figure 5:
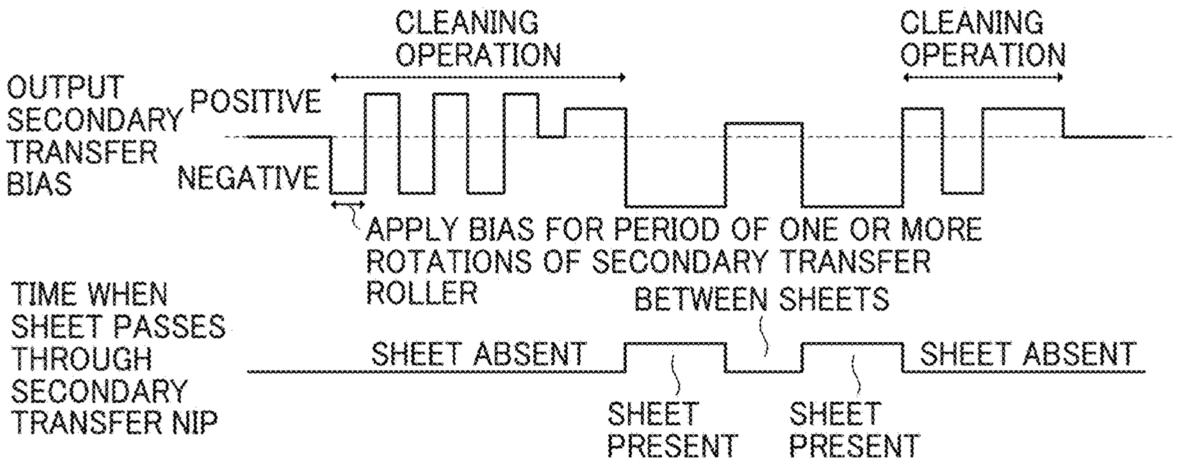
FIG. 5 is a timing chart of a cleaning operation.

FIG. 5 is a timing chart of the cleaning operation.

As illustrated in FIG. 5, when the cleaning operation is executed, a negative bias and a positive bias are alternately applied to the opposed roller 18A to form an alternating electric field at the secondary transfer nip. The alternating electric field thus formed enhances efficient cleaning of the toner adhering to the secondary transfer roller 18 by the hopping effect. The hopping effect is an effect that facilitates the movement of the toner from the secondary transfer roller 18 to the intermediate transfer belt 17 as the toner reciprocates between the secondary transfer roller 18 and the intermediate transfer belt 17. The alternating electric field thus formed moves the bipolar toner adhering to the secondary transfer roller 18 to the intermediate transfer belt 17, thus enhancing reliable cleaning of the surface of the secondary transfer roller 18.

Each of the period of negative application (i.e., application of the negative bias) and the period of positive application (i.e., application of the positive bias) for forming the alternating electric field is a period of one or more rotations of the secondary transfer roller 18. In the cleaning operation performed before the first sheet passes through the secondary transfer nip in FIG. 5, the negative application to the positive application may be performed three times. In other words, the negative bias and the positive bias are alternately applied three times such that the positive bias is applied after the negative bias is applied. Thereafter, the bias is set to 0 once and the positive bias is applied again. The length of the positive bias thus applied again is adjusted according to the time when the sheets are fed. The bias may not be set to 0 once.

The negative application to the positive application may be performed once as in the cleaning operation performed after the final sheet passes through the secondary transfer nip in FIG. 5. Alternatively, the negative application to the positive application may be performed four times or more. In addition, the bias values in the first and second times of the negative application to the positive application may not be constant. In other words, the timing chart may present a behavior of gradually amplifying or attenuating the bias).

Now, a specific description is given of the cleaning operation together with the time when the scraping toner pattern passes through the secondary transfer nip according to some specific examples.

Figure 6:
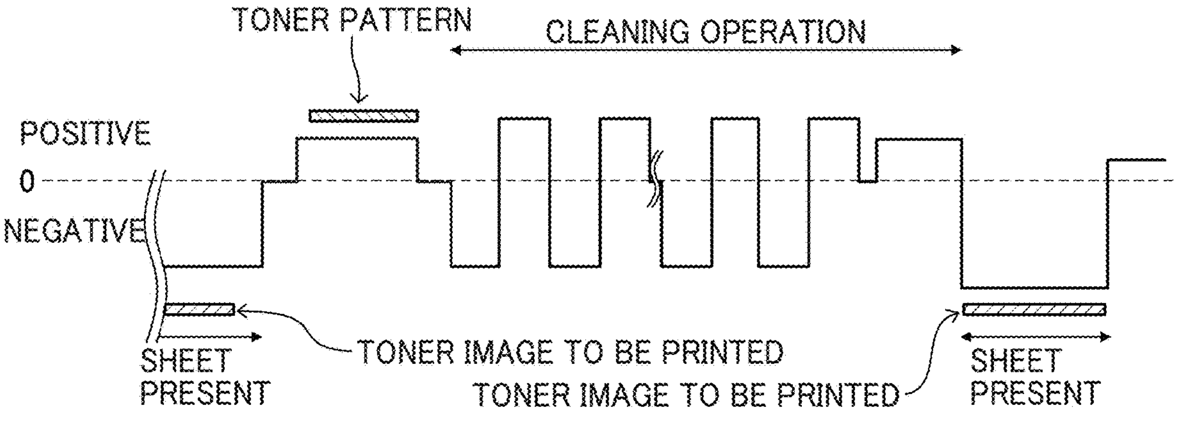
FIG. 6 is a timing chart of the cleaning operation and the passage of the scraping toner pattern according to a first example.

Referring now to FIG. 6, a description is given of a first example.

FIG. 6 is a timing chart of the cleaning operation and the passage of the scraping toner pattern according to the first example.

As illustrated in FIG. 6, in the first example, the cleaning operation is executed after the scraping toner pattern passes through the secondary transfer nip and before the sheet P reaches the secondary transfer nip. By the cleaning operation executed at this time, the toner adhering to the secondary transfer roller 18 when the scraping toner pattern passes through the secondary transfer nip is moved to the intermediate transfer belt 17 to clean the secondary transfer roller 18 before the next sheet reaches the secondary transfer nip. Accordingly, the sheet passes through the secondary transfer nip with an increased margin for the back contamination caused by the secondary transfer roller 18. In short, the contamination on the back side of the sheet is favorably prevented.

The first example is suitable for forming the scraping toner pattern at the position (1), which is the position before the first sheet to the secondary transfer nip, or the position (5), which is the position after the last sheet passes through the secondary transfer nip, illustrated in FIG. 2. The cleaning operation may be executed immediately after the scraping toner pattern passes through the secondary transfer nip. Alternatively, the cleaning operation may be executed at a point in time that allows the cleaning operation to end immediately before the next sheet reaches the secondary transfer nip.

In addition, the first example may be employed in a case where the sheet interval is wide as described below and the scraping toner pattern is formed at the position (3), which is the position in the non-image forming area at the trailing end of a sheet that passes through the secondary transfer nip, or the position (4), which is the position between sheets (i.e., the position in the sheet interval), illustrated in FIG. 2. In other words, the first example may be employed in a case where the sheet interval is to be wide in relation to, e.g., post-processing and the cleaning operation executed after the scraping toner pattern passes through the secondary transfer nip can be completed before the next sheet reaches the secondary transfer nip.

Figure 7A:
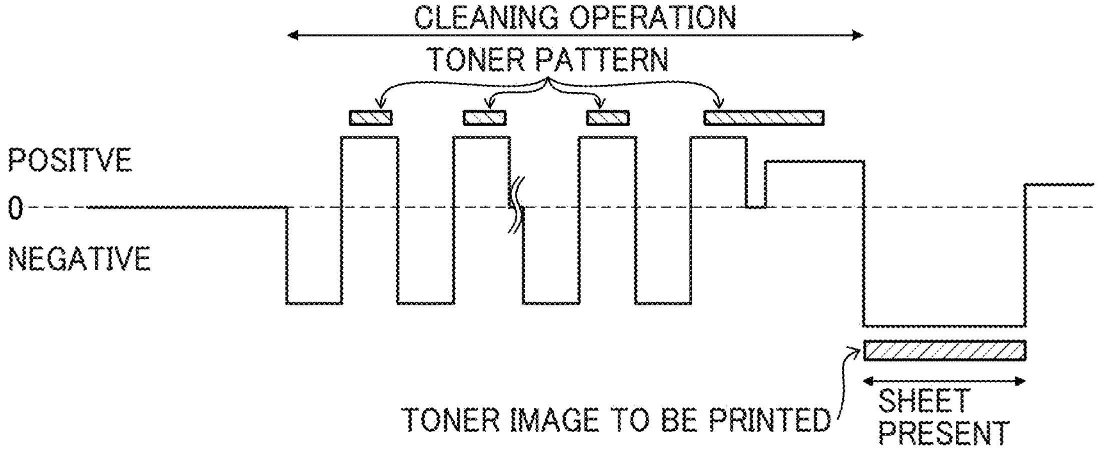
FIGS. 7A to 7C are timing charts of the cleaning operation and the passage of the scraping toner pattern according to a second example.
Figure 7B:
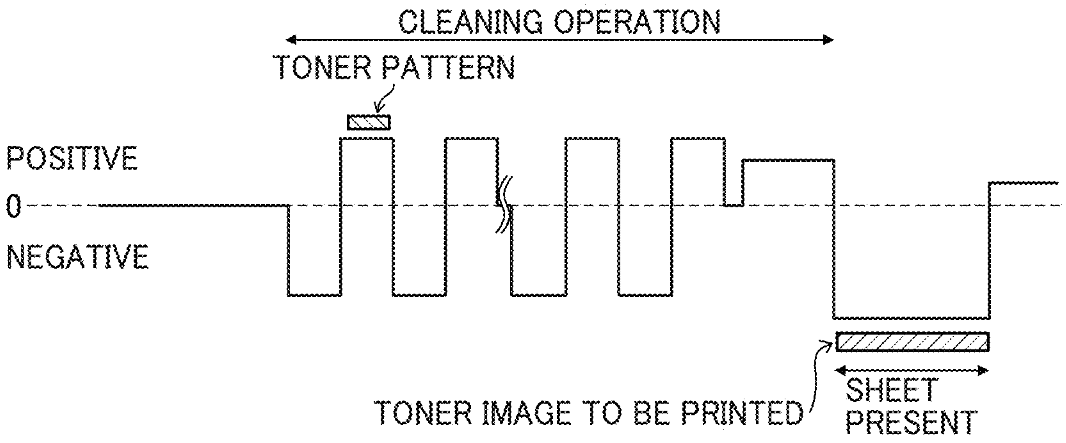
Figure 7C:
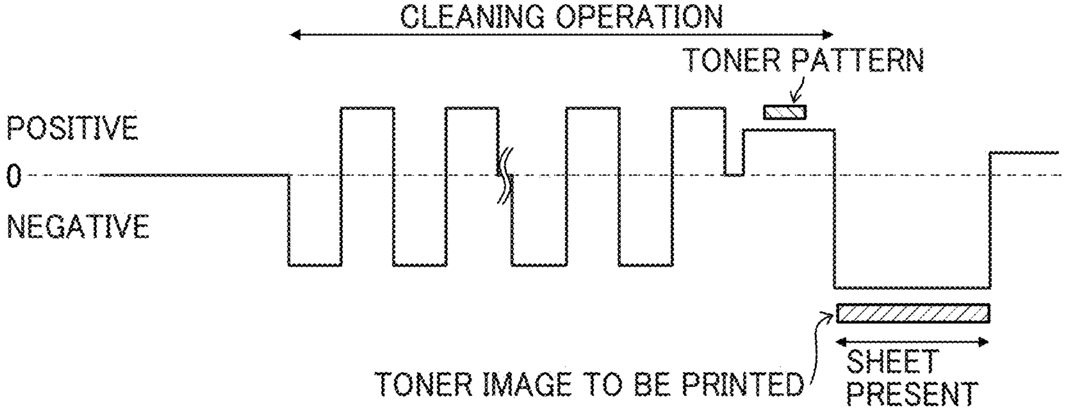

Referring now to FIGS. 7A to 7C, a description is given of a second example.

FIGS. 7A to 7C are timing charts of the cleaning operation and the passage of the scraping toner pattern according to the second example.

As illustrated in FIGS. 7A to 7C, in the second example, the scraping toner pattern passes through the secondary transfer nip during the cleaning operation.

As illustrated in FIG. 7A, the scraping toner pattern divided into a plurality of portions may pass through the secondary transfer nip at the time of application of the positive bias and the zero bias during the cleaning operation. Alternatively, as illustrated in FIG. 7B, the scraping toner pattern may pass through the secondary transfer nip at the time of the first application of the positive bias in the cleaning operation. Alternatively, as illustrated in FIG. 7C, the scraping toner pattern may pass through the secondary transfer nip at the time of the last application of the positive bias in the cleaning operation.

Since the scraping toner pattern passes through the secondary transfer nip at the time of application of the positive bias in the cleaning operation as illustrated in FIGS. 7A to 7C, the scraping toner pattern passes through the secondary transfer nip without being transferred to the secondary transfer roller 18. Thereafter, the scraping toner pattern is input to the cleaning area. The toner staying at the cleaning area scrapes off the filming on the intermediate transfer belt 17.

The reversely charged toner of the scraping toner pattern electrostatically moved to the secondary transfer roller during the cleaning operation and the normally charged toner mechanically scraped off by the secondary transfer roller 18 also move to the intermediate transfer belt 17 during the cleaning operation. Thus, the toner of the scraping toner pattern adhering to the secondary transfer roller 18 is removed to some extent, although the extent of removal is lower than that in the first example. Accordingly, the margin for the back contamination is increased to a level at which the back side of the sheet is not contaminated.

In the second example, since the scraping toner pattern passes through the secondary transfer nip during the cleaning operation, the formation of the scraping toner pattern and the cleaning operation are executed in a shorter period of time than in the first example in which the cleaning operation is executed after the scraping toner pattern passes through the secondary transfer nip.

For example, in a case where the scraping toner pattern is formed at the position (1), which is the position before the first sheet to the secondary transfer nip illustrated in FIG. 2, and the first example is executed (i.e., the cleaning operation is executed after the scraping toner pattern passes through the secondary transfer nip), the image formation is to be started earlier. As a result, an increase in the traveling distances of, e.g., the photoconductive drum 11 and the intermediate transfer belt 17 may shorten the life of these components. In a case where the scraping toner pattern is formed at the position (5), which is the position after the last sheet passes through the secondary transfer nip, the completion of image formation is delayed. As a result, similarly to the case described above, an increase in the traveling distances of, e.g., the photoconductive drum 11 and the intermediate transfer belt 17 may shorten the life of these components.

By contrast, in the second example, since the scraping toner pattern passes through the secondary transfer nip during the cleaning operation, the image formation is started later than in the first example in a case where the scraping toner pattern is formed at the position (1), which is the position before the first sheet to the secondary transfer nip illustrated in FIG. 2. In a case where the scraping toner pattern is formed the position (5) illustrated in FIG. 2, which is the position after the last sheet passes through the secondary transfer nip, the completion of image formation is earlier in the second example than in the first example. Accordingly, the second example reduces an increase in the traveling distance of the image forming members, such as the photoconductive drum 11 and the intermediate transfer belt 17, compared with the first example, thus preventing the life of the image forming members from being shortened, compared with the first example.

The second example may be employed in a case where the cleaning operation can be performed at the distance between sheets or the distance between a trailing and of an image area of a sheet and a leading end of an image area of the following sheet and where the scraping toner pattern is formed at the position (3), which is the position in the non-image forming area at the trailing end of a sheet that passes through the secondary transfer nip, or the position (4), which is the position between sheets, illustrated in FIG. 2.

For example, the case illustrated in FIG. 7A is suitable for forming the scraping toner pattern at the position (4), which is the position between sheets illustrated in FIG. 2. The case illustrated in FIG. 7B is suitable for forming the scraping toner pattern at the position (3), which is the position in the non-image forming area at the trailing end of a sheet that passes through the secondary transfer nip, or the position (5), which is the position after the last sheet passes through the secondary transfer nip, illustrated in FIG. 2. The case illustrated in FIG. 7C is suitable for forming the scraping toner pattern at the position (1), which is the position before the first sheet to the secondary transfer nip illustrated in FIG. 2, or the position in the non-image forming area at the leading end of a sheet that passes through the secondary transfer nip.

Figure 8:
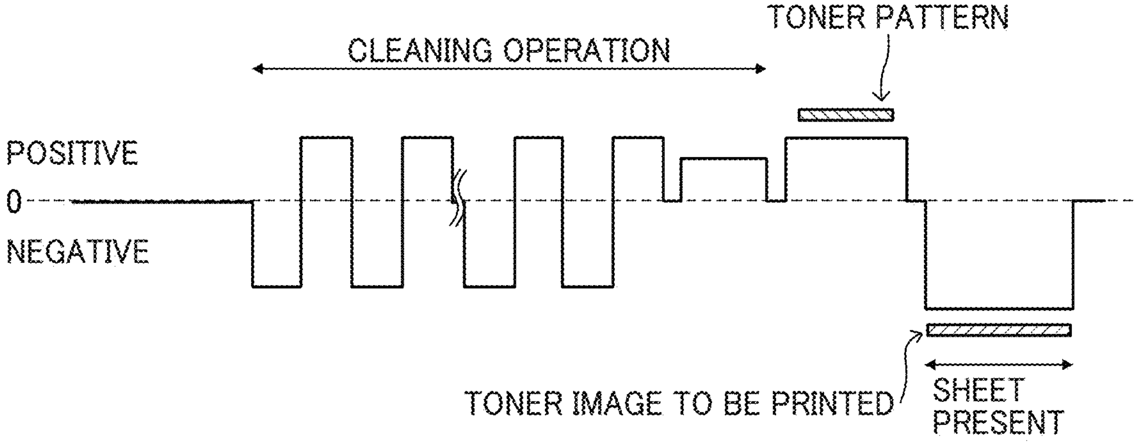
FIG. 8 is a timing chart of the cleaning operation and the passage of the scraping toner pattern according to a third example.

Referring now to FIG. 8, a description is given of a third example.

FIG. 8 is a timing chart of the cleaning operation and the passage of the scraping toner pattern according to the third example.

As illustrated in FIG. 8, in the third example, the scraping toner pattern passes through the secondary transfer nip after the cleaning operation.

In some cases, the scraping toner pattern may not pass through the secondary transfer nip at the point in time described above in the first example or the second example in relation to the control of the copier 1. In such cases, as in the third example, after the cleaning operation is executed to increase the margin for the back contamination caused by the secondary transfer roller 18 in advance, the scraping toner pattern passes through the secondary transfer nip.

Figure 9:
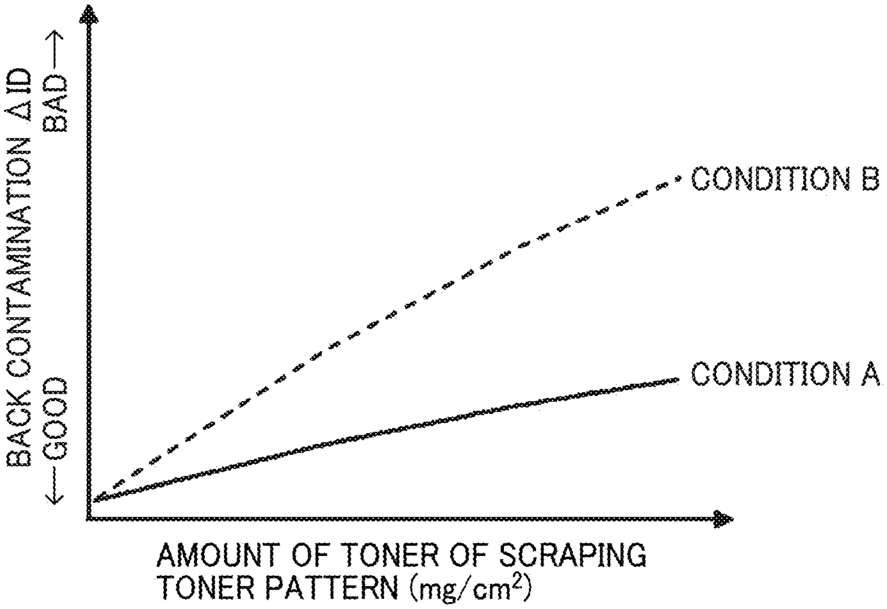
FIG. 9 is a graph illustrating a verification of an effect of the third example.

FIG. 9 is a graph illustrating a verification of an effect of the third example.

The broken line in FIG. 9 indicates the relationship between the amount of toner of the scraping toner pattern and the back contamination when the cleaning operation of the secondary transfer roller 18 is not performed. The solid line in FIG. 9 indicates the relationship between the amount of toner of the scraping toner pattern and the back contamination in the third example in which the scraping toner pattern passes through the secondary transfer nip after the cleaning operation of the secondary transfer roller 18 is performed.

As illustrated in FIG. 9, the contamination of the back side of the sheet is sufficiently prevented in the third example in which the scraping toner pattern passes through the secondary transfer nip after the cleaning operation is executed to increase the margin for the back contamination caused by the secondary transfer roller 18 in advance.

Figure 10:
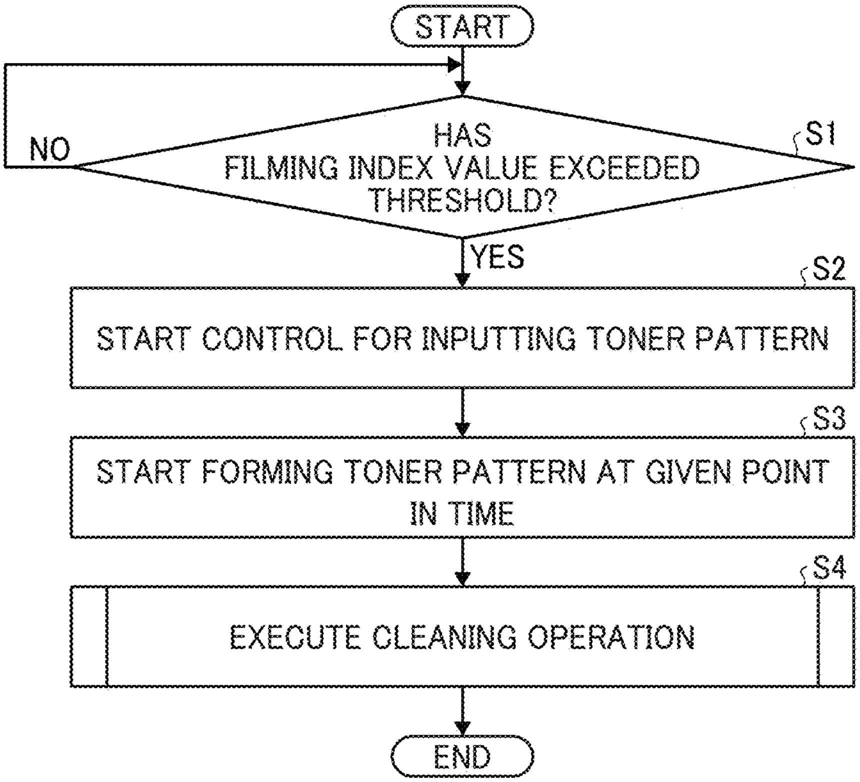
FIG. 10 is a flowchart of input of the scraping toner pattern.

FIG. 10 is a flowchart of input of the scraping toner pattern.

As illustrated in FIG. 10, in step S1, the control unit 90 of the copier 1 determines whether the filming index value calculated based on, e.g., the image forming mode has exceeded a threshold. When determining that the filming index value has not exceeded the threshold (NO in step S1), the control unit 90 repeats the determination in step S1. By contrast, when determining that the filming index value has exceeded the threshold (YES in step S1), in step S2, the control unit 90 starts input control, which is control for inputting the scraping toner pattern to the cleaning area. In step S3, the control unit 90 starts forming the scraping toner pattern at a given point in time. In step S4, the control unit 90 executes the cleaning operation at a given point in time. In the first example, the given point in time to execute the cleaning operation is after the scraping toner pattern passes through the secondary transfer nip. In the second example, the given point in time to execute the cleaning operation is when the scraping toner pattern passes through the secondary transfer nip. In the third example, the given point in time to execute the cleaning operation is a point in time that allows the cleaning operation to end before the scraping toner pattern passes through the secondary transfer nip.

Note that the first to third examples may be performed as appropriate for the relation to the position at which the scraping toner pattern is formed on the intermediate transfer belt 17 and the relation to the other operations. As described above, the cleaning operation is executed based on the time when the scraping toner pattern on the intermediate transfer belt 17 passes through the secondary transfer nip. However, the execution of the cleaning operation is not limited to the ways described above. For example, a toner pattern for image adjustment such as a gradation pattern also passes through the secondary transfer nip without being secondarily transferred to the sheet. The cleaning operation is executed as described above in the first to third examples according to the time when the toner pattern for image adjustment passes through the secondary transfer nip, to enhance the margin for the back contamination caused by the secondary transfer roller 18, more specifically, by the toner of the toner pattern for image adjustment adhering to the secondary transfer roller 18.

A description has been given of the case where the cleaning operation is executed according to the time when the scraping toner pattern passes through the secondary transfer nip. Alternatively, the scraping toner pattern may be formed according to the time when the cleaning operation is executed. Now, a description is given of such a case as a fourth example.

As one example of the time when the cleaning operation is executed, the cleaning operation is executed after the printing operation is started and before the first sheet passes through the secondary transfer nip as illustrated in FIG. 5. In the following description, the cleaning operation performed at such time may be referred to as a pre-sheet-passage cleaning operation. As another example of the time when the cleaning operation is executed, the cleaning operation is executed after the last sheet passes through the secondary transfer nip and before the printing operation is completed as illustrated in FIG. 5. In the following description, the cleaning operation performed at such time may be referred to as a post-sheet-passage cleaning operation.

Examples of the time (point in time) when the scraping toner pattern passes through the secondary transfer nip in the fourth example are as below.

Point in time A: between sheets

Point in time B: before the pre-sheet-passage cleaning operation

Point in time C: during the pre-sheet-passage cleaning operation

Point in time D: during the post-sheet-passage cleaning operation

Point in time E: after the post-sheet-passage cleaning operation

Point in time F: any point in time other than during the printing operation

Each of the points in time A to E indicates the time when the scraping toner pattern passes through the secondary transfer nip during the printing operation. In the case of the point in time F where the scraping toner pattern passes through the secondary transfer nip at the point in time F, when the filming index value calculated based on the image forming mode or the traveling distance of the intermediate transfer belt 17 exceeds the threshold, the scraping toner pattern is formed at a point in time other than during the printing operation, such as after the completion of the printing operation or before the start of the printing operation.

A higher frequency of input of the scraping toner pattern to the cleaning area is preferable. An increased frequency of input of the scraping toner pattern to the cleaning area prevents a shortage of the toner staying at the cleaning area though the amount of toner of the scraping toner pattern is relatively small. As a result, the effect of removing the filming with the toner staying at the cleaning area is maintained. A decreased amount of toner of the scraping toner pattern reduces the amount of toner adhering to the secondary transfer roller 18 when the scraping toner pattern passes through the secondary transfer nip.

In a case where the amount of toner of the scraping toner pattern is relatively large, a large amount of toner input to the cleaning blade 31 at a time may cause some or all of the toner to stay at the cleaning area for a long period of time. Such long-term staying toner receives a physical hazard due to stick slip of the cleaning blade 31, resulting in deterioration of the toner and the external additives. As a result, the filming removal performance is lowered. To prevent such a situation, an increase in the frequency of input of the scraping toner pattern to the cleaning blade 31 is preferable to frequently input the toner that is not impaired to the cleaning area and enhance the effect of removing the filming with the toner staying at the cleaning area.

In a case where a relatively small amount of toner is frequently input to the cleaning area, the point in time A (between sheets) is most preferable because the frequency of formation of the scraping toner pattern is the highest. The point in time C (during the pre-sheet-passage cleaning operation) is secondly preferable. This is because various histories of contamination of the secondary transfer roller 18, such as the secondary transfer roller 18 being left in a state of being contaminated with toner before printing, are to be reset in the pre-sheet-passage cleaning operation. For this reason, as illustrated in FIG. 5, in the pre-sheet-passage cleaning operation, the alternating electric field is formed by performing the negative application to the positive application a plurality of times. Accordingly, as illustrated in FIG. 7A, the scraping toner pattern is formed when the positive voltage is applied a plurality of times. Thus, the frequency of input of the scraping toner pattern is increased.

On the other hand, in the post-sheet passage cleaning operation, the alternating electric field is formed only once as illustrated in FIG. 5. In other words, the frequency of input of the scraping toner pattern in the case of the point in time D where the scraping toner pattern passes through the secondary transfer nip during the post-sheet-passage cleaning operation is lower than that in the case of the point in time C where the scraping toner pattern passes through the secondary transfer nip during the pre-sheet-passage cleaning operation. The frequency of input of the scraping toner pattern in the case of the point in time B where the scraping toner pattern passes through the secondary transfer nip before the pre-sheet-passage cleaning operation is substantially the same as that in the case of the point in time D where the scraping toner pattern passes through the secondary transfer nip during the post-sheet-passage cleaning operation, in consideration of the time from the start of the printing operation to the start of formation of the toner image to be printed. In addition, the frequency of input of the scraping toner pattern in the case of the point in time E where the scraping toner pattern passes through the secondary transfer nip after the post-sheet-passage cleaning operation is substantially the same as that in the case of the point in time D where the scraping toner pattern passes through the secondary transfer nip during the post-sheet-passage cleaning operation, in consideration of the time from the end of the post-sheet-passage cleaning operation to the end of the printing operation.

In the case of the point in time F where the scraping toner pattern passes through the secondary transfer nip at any point in time other than during the printing operation, since the scraping toner pattern is formed when the calculated filming index value exceeds the threshold, the frequency of input of the scraping toner pattern is lower than that in any other cases of the points in time A to E where the toner is input for each printing operation described above.

In short, the frequency of input of the scraping toner pattern to the cleaning blade 31 is as follows: point in time A>point in time C>point in time B=point in time D=point in time E>point in time F.

In other words, the frequency of input of the scraping toner pattern to the cleaning blade 31 in the case of the point in time A where the scraping toner pattern passes through the secondary transfer nip between sheets is the highest. The filming is favorably removed though the amount of toner of the scraping toner pattern is relatively small. Since the amount of toner of the scraping toner pattern is reduced, the amount of toner adhering to the secondary transfer roller 18 is also reduced when the scraping toner pattern passes through the secondary transfer nip. In addition, since the toner that is not impaired stays at the cleaning area, the effect of removing the filming with the toner is enhanced.

When the points in time A to F are arranged in ascending order of concern for the back contamination, the point in time D (during the post-sheet-passage cleaning operation) provides little concern for the back contamination. This is because the toner adhering to the secondary transfer roller 18 is removed in the post-sheet-passage cleaning operation, and the remaining toner adhering to the secondary transfer roller 18 is removed in the pre-sheet-passage cleaning operation in the next printing operation. Since continuous printing is performed while sufficiently increasing the margin for the back contamination, the concern for the back contamination is reduced.

Although the point in time E (after the post-sheet-passage cleaning operation) and the point in time B (before the pre-sheet-passage cleaning operation) provide greater concern for the back contamination than the point in time D, the point in time E and the point in time B also provide little concern for the back contamination, because the toner adhering to the secondary transfer roller 18 is removed in the pre-sheet-passage cleaning operation. However, in consideration of factors of long-term non-use, the point in time E provides a lower margin for the back contamination than the point in time B. In the case of the point in time B, immediately after the scraping toner pattern passes through the secondary transfer nip, the pre-sheet-passage cleaning operation is started. On the other hand, in the case of the point in time E, the toner of the scraping toner pattern transferred to the secondary transfer roller 18 may be left for a long period of time and firmly adhere to the secondary transfer roller 18. Such toner adhering to the secondary transfer roller 18 may fail to be transferred to the intermediate transfer belt 17 in the pre-sheet-passage cleaning operation and remain on the secondary transfer roller 18. Such toner adhering to and remaining on the secondary transfer roller 18 may be peeled off from the secondary transfer roller 18 by the sheets passing through the secondary transfer nip and adhere to the sheets. For this reason, the point in time E provides greater concern for the back contamination than the point in time B.

In the case of the point in time C where the scraping toner pattern passes through the secondary transfer nip during the pre-sheet-passage cleaning operation, only part of the toner of the scraped toner pattern adhering to the secondary transfer roller 18 during pre-sheet-passage cleaning operation is moved to the intermediate transfer belt 17. For this reason, the point in time C provides a lower margin for the back contamination than the point in time B (before the pre-sheet-passage cleaning operation) and the point in time E (after the post-sheet-passage cleaning operation).

On the other hand, in the case of the point in time A where the scraping toner pattern passes through the secondary transfer nip between sheets, the following sheet of the sheets passes through the secondary transfer nip without removal of the toner of the scraping toner pattern adhering to the secondary transfer roller 18. Since the frequency of input of the scraping toner pattern in the case of the point in time A is relatively high, the amount of toner of the scraping toner pattern is reduced. In addition, the amount of toner adhering to the secondary transfer roller 18 is reduced when the scraping toner pattern passes through the secondary transfer nip. However, when a large number of sheets are subjected to continuous printing, the margin for the back contamination caused by the secondary transfer roller 18 gradually decreases, and the back contamination is more likely to occur in the latter half of the sheets in the continuous printing. In other words, the point in time A (between sheets) provides the greatest concern for the back contamination.

Note that the point in time F (any point in time other than during the printing operation) provides the least concern for the side effect of the back contamination. This is because, in the case of the point in time F, the cleaning operation is performed after the scraping toner pattern passes through the secondary transfer nip as described above in the first example. The secondary transfer roller 18 is favorably cleaned by a plurality of times of application of the alternating voltage in the cleaning operation thus performed. Accordingly, in the case of the point in time F, the margin for the back contamination caused by the secondary transfer roller 18 is increased.

In short, in the fourth example, the points in time A to F are arranged in ascending order of concern for the side effect of the back contamination as follows: point in time F>point in time D>point in time B≥point in time E>point in time C>point in time A.

A combination of the point in time C and the point in time Fis an example combination of two or more of the points in time A to F in consideration of the frequency of input of the scraping toner pattern and the concern for the side effect of the back contamination described above.

In the case of the point in time C, since the frequency of input of the scraping toner pattern is fairly high, the amount of toner of the scraping toner pattern is reduced while the effect of removing the filming with the toner staying at the cleaning area is enhanced. In addition, the amount of toner adhering to the secondary transfer roller 18 is reduced when the scraping toner pattern passes through the secondary transfer nip.

In the case of the point in time C, for example, the amount of toner of the scraping toner pattern is reduced to such an extent that is sufficient to increase the margin for the back contamination by the pre-sheet-passage cleaning operation. The amount of toner that is insufficient by the input of the scraping toner pattern in the case of the point in time C is compensated by the scraping toner pattern formed based on the traveling distance of the intermediate transfer belt 17 or the image forming mode in the case of the point in time F. Accordingly, the contamination on the back side of the sheet is prevented while the filming is favorably removed.

Another example combination of the points in time A to F is a combination of the point in time C (during the pre-sheet-passage cleaning operation) and the point in time D (during the post-sheet-passage cleaning operation). The combination of the point in time C and the point in time D is a combination that balances the frequency of input of the scraping toner pattern and the margin for the back contamination. In both the cases of the point in time C and the point in time D, the scraping toner pattern passes during the cleaning operation. Specifically, the scraping toner pattern passes through the secondary transfer nip when the positive bias is applied. For this reason, the toner of the scraping toner pattern adhering to the secondary transfer roller 18 is mainly an oppositely charged toner having a positive polarity. In a case where the distribution amount of the reversely charged toner is small in the characteristics of the charged amount distribution of the toner of the scraping toner pattern, the toner of the scraping toner pattern hardly adheres to the secondary transfer roller 18. In short, the margin for the back contamination is greatly enhanced.

As yet another example, a combination of the point in time A (between sheets) and the point in time C (during the pre-sheet-passage cleaning operation) mostly increases the frequency of input of the scraping toner pattern among combinations of two points in time. The combination of the point in time A and the point in time C minimizes the amount of toner of the scraping toner pattern in the combinations of two points in time. Thus, the amount of toner adhering to the secondary transfer roller 18 is reduced when the scraping toner pattern passes through the secondary transfer nip.

Accordingly, when a small number of sheets are subjected to continuous printing, even the combination of the point in time A (between sheets) and the point in time C (during the pre-sheet-passage cleaning operation) prevents the contamination on the back side of the sheet.

In addition, since the toner that is not impaired is frequently input little by little, this combination is preferable to prevent the toner from staying at the cleaning area for a long period of time and enhance the effect of removing the filming with the toner staying at the cleaning area.

Although a description has been given of some cases each having a combination of two of the points in time A to F, the scraping toner pattern may pass through the secondary transfer nip at three or more of the points in time A to F or at any one of the points in time B to E and be input to the cleaning area.

In addition, for example, the time when the scraping toner pattern passes through the secondary transfer nip or the amount of toner of the scraping toner pattern may be changed depending on whether the printing operation is performed in the color image mode or the monochrome image mode. When the printing operation is performed in the color image mode, a relatively large amount of toner fails to be transferred as residual toner. As a result, a relatively large amount of residual toner is input to the cleaning area during the printing operation. For this reason, in the color image mode, for example, the scraping toner pattern passes through the secondary transfer nip only at the point in time D (during the post-sheet-passage cleaning operation), which provides the least concern for the back contamination among the points in time during the printing operation. By contrast, when the printing operation is performed in the monochrome image mode, a relatively small amount of residual toner is input to the cleaning area. For this reason, for example, the scraping toner pattern passes through the secondary transfer nip at the point in time A (between sheets) and the point in time C (during the pre-sheet-passage cleaning operation) described above and is input to the cleaning area.

Alternatively, the time when the scraping toner pattern passes through the secondary transfer nip and the amount of toner of the scraping toner pattern may be changed based on the traveling distance of the intermediate transfer belt 17 from the start of the printing operation to the end of the printing operation. For example, in a case where a relatively large number of sheets are subjected to printing and therefore the traveling distance of the intermediate transfer belt 17 increases from the start of the printing operation to the end of the printing operation, the scraping toner pattern does not pass through the secondary transfer nip at the point in time A (between sheets) or input to the cleaning area. Instead, the scraping toner pattern passes through the secondary transfer nip at any one of the points in time B to E and is input to the cleaning area. In the case of the point in time B where the scraping toner pattern passes through the secondary transfer nip before the pre-sheet-passage cleaning operation or in the case of the point in time C where the scraping toner pattern passes through the secondary transfer nip during the pre-sheet-passage cleaning operation, the amount of toner of the scraping toner pattern is increased as the traveling distance of the intermediate transfer belt 17 increases, to prevent the shortage of the toner staying at the cleaning area of the cleaning blade 31 during the printing operation.

From the viewpoint of the frequency of input of the scraping toner pattern, most preferably, the scraping toner pattern passes through the secondary transfer nip at all the points A to F in time and is input to the cleaning area. When the scraping toner pattern passes through the secondary transfer nip at all the points in time A to F described above and is input to the cleaning area, the amount of toner of the scraping toner pattern is favorably reduced. Accordingly, the amount of toner adhering to the secondary transfer roller 18 is favorably reduced when the scraping toner pattern passes through the secondary transfer nip. In addition, since the toner that is not impaired is frequently input little by little, this case is preferable to prevent the toner from staying at the cleaning area for a long period of time and enhance the effect of removing the filming with the toner staying at the cleaning area.

Although the image forming apparatus employs an intermediate transfer method in the embodiments and examples described above, the image forming apparatus may employ a direct transfer method to directly transfer a toner image on a photoconductive drum onto a sheet as a recording medium, instead of the intermediate transfer method. In the image forming apparatus employing the direct transfer method, the image bearer corresponds to the photoconductive drum as a photoconductor while the transfer member corresponds to a transfer roller that contacts the photoconductive drum to form a transfer nip. In addition, the cleaning member corresponds to a photoconductor cleaning blade that cleans the surface of the photoconductor. The image forming unit includes a charging device, a writing unit (exposure unit), and a developing device.

Although specific embodiments and examples are described, the embodiments and examples according to the present disclosure are not limited to those specifically described herein. Several aspects of the image forming apparatus are exemplified as follows.

Now, a description is given of a first aspect.

An image forming apparatus such as the copier 1 includes an image bearer such as the intermediate transfer belt 17, a transfer member such as the secondary transfer roller 18 that contacts the image bearer to form a transfer nip and transfer a toner image on the image bearer to a recording medium such as the sheet P at the transfer nip, and a cleaning member such as the cleaning blade 31 that cleans a surface of the image bearer. The image forming apparatus further includes a control unit such as the control unit 90 that executes a cleaning operation of moving an extraneous matter adhering to the transfer member to the image bearer to clean the transfer member. The control unit executes the cleaning operation after a toner image pattern that is not transferred to the recording medium passes through the transfer nip and before the recording medium enters the transfer nip.

When the toner image pattern that is not transferred to the recording medium passes through the transfer nip, part of toner of the toner image pattern may adhere to the transfer member. When the toner image is transferred to the recording medium at the transfer nip, the toner adhering to the transfer member may adhere to the back side of the recording medium and contaminate the back side of the recording medium.

To prevent such back contamination, according to the first aspect, the control unit executes the cleaning operation after the toner image pattern that is not transferred to the recording medium passes through the transfer nip and before the recording medium enters the transfer nip, to move the extraneous matter on the transfer member to the image bearer, thus removing the extraneous matter from the transfer member. Accordingly, the recording medium passes through the transfer nip formed by the transfer member from which the toner of the toner image pattern adhering to the transfer member is removed. As a result, the contamination of the back side of the recording medium is prevented.

Now, a description is given of a second aspect.

An image forming apparatus such as the copier 1 includes an image bearer such as the intermediate transfer belt 17, a transfer member such as the secondary transfer roller 18 that contacts the image bearer to form a transfer nip and transfer a toner image on the image bearer to a recording medium such as the sheet P at the transfer nip, and a cleaning member such as the cleaning blade 31 that cleans a surface of the image bearer. The image forming apparatus further includes a control unit such as the control unit 90 that executes a cleaning operation of moving an extraneous matter adhering to the transfer member to the image bearer to clean the transfer member. The control unit causes a toner image pattern that is not transferred to the recording medium to pass through the transfer nip during the cleaning operation.

According to the second aspect, as described above in the second example, since the toner image pattern such as the scraping toner pattern passes through the transfer nip such as the secondary transfer nip when an electric field is formed at the transfer nip and therefore normally charged toner of the toner image pattern is electrostatically attracted to the image bearer during the cleaning operation, the toner image pattern passes through the transfer nip without being transferred to the transfer member such as the secondary transfer roller 18. As a result, the toner image pattern is input to a contact portion such as the cleaning area of the cleaning member in contact with the image bearer and the toner of the toner image pattern stays at the cleaning area. The toner staying at the contact portion of the cleaning member in contact with the image bearer favorably scrapes off the filming on the image bearer, thus removing the filming from the image bearer.

The control unit executes the cleaning operation to move, to the image bearer, the toner adhering to the transfer member when the toner image pattern passes through the transfer nip. Accordingly, the margin for the back contamination caused by the transfer member is increased. Thus, the contamination of the back side of the recording medium such as the sheet P (e.g., a sheet of paper) is prevented.

Now, a description is given of a third aspect.

An image forming apparatus such as the copier 1 includes an image bearer such as the intermediate transfer belt 17, a transfer member such as the secondary transfer roller 18 that contacts the image bearer to form a transfer nip and transfer a toner image on the image bearer to a recording medium such as the sheet P at the transfer nip, and a cleaning member such as the cleaning blade 31 that cleans a surface of the image bearer. The image forming apparatus further includes a control unit such as the control unit 90 that executes a cleaning operation of moving an extraneous matter adhering to the transfer member to the image bearer to clean the transfer member. The control unit completes the cleaning operation before a toner image pattern that is not transferred to the recording medium reaches the transfer nip.

According to the third aspect, as described above in the third example, the toner of the toner image pattern adheres to the transfer member that is cleaned in advance and has an increased margin for the back contamination. Thus, the margin for the back contamination caused by the transfer member after the toner image pattern passes through the transfer nip is prevented from decreasing to a level at which the back side of the recording medium is contaminated. Accordingly, similarly to the first aspect, the third aspect prevents the contamination of the back side of the recording medium.

Now, a description is given of a fourth aspect.

An image forming apparatus such as the copier 1 includes an image bearer such as the intermediate transfer belt 17, a transfer member such as the secondary transfer roller 18 that contacts the image bearer to form a transfer nip and transfer a toner image on the image bearer to a recording medium such as the sheet P at the transfer nip, and a cleaning member such as the cleaning blade 31 that cleans a surface of the image bearer. The image forming apparatus further includes a control unit such as the control unit 90 that executes an image forming operation such as a printing operation of forming an image on the recording medium. The image forming operation includes a pre-sheet-passage cleaning operation of moving an extraneous matter adhering to the transfer member to the image bearer to clean the transfer member before a first recording medium of recording media continuously conveyed reaches the transfer nip and a post-sheet-passage cleaning operation of moving the extraneous matter adhering to the transfer member to the image bearer to clean the transfer member after a last recording medium of the recording media continuously conveyed passes through the transfer nip. The control unit causes a toner image pattern that is not transferred to the recording medium to pass through the transfer nip at at least one of the following points in time 1 to 4 during the image forming operation.

Point in time 1: before starting the pre-sheet-passage cleaning operation (Point in time B in the fourth example)

Point in time 2: during the pre-sheet-passage cleaning operation (Point in time C in the fourth example)

Point in time 3: during the post-sheet-passage cleaning operation (Point in time D in the fourth example)

Point in time 4: after the post-sheet-passage cleaning operation (Point in time E in the fourth example)

According to the fourth aspect, as described above in the fourth example, the toner image pattern passes through the transfer nip at a plurality of points in time and is input to the cleaning member. Thus, the toner is input to the cleaning area of the cleaning member at high frequency. Accordingly, the shortage of the amount of the toner staying at the cleaning area is prevented and the filming is favorably removed from the image bearer. Since the toner image pattern is formed at a plurality of points in time, the toner that is not impaired is frequently input to the cleaning area. Accordingly, the effect of removing the filming with the toner staying at the cleaning area is favorably maintained, and therefore the filming is favorably removed from the surface of the image bearer.

Now, a description is given of a fifth aspect.

In the image forming apparatus such as the copier 1 according to the fourth aspect, the control unit such as the control unit 90 causes the toner image pattern that is not transferred to the recording medium such as the sheet P to pass through the transfer nip at at least the point in time 2 (the point in time C in the fourth example) and a point in time other than during the image forming operation (the point in time F in the fourth example).

According to the fifth aspect, as described above in the fourth example, the amount of toner of the toner image pattern such as the scraping toner pattern in the case of the point in time 2 is reduced to such an extent that is sufficient to increase the margin for the back contamination by the pre-sheet-passage cleaning operation. Accordingly, the contamination of the back side of the recording medium is prevented. In addition, the fifth aspect prevents the shortage of the toner staying at the cleaning area during the printing operation. Accordingly, the filming is favorably removed from the image bearer. In the fifth aspect, the amount of toner that is insufficient by the input of the scraping toner pattern in the case of the point in time 2 is input to the cleaning area at a given point in time during the printing operation.

Accordingly, the contamination on the back side of the recording medium is prevented while the filming is favorably removed.

Now, a description is given of a sixth aspect.

In the image forming apparatus such as the copier 1 according to the fourth aspect, the control unit such as the control unit 90 causes the toner image pattern that is not transferred to the recording medium such as the sheet P to pass through the transfer nip at at least the point in time 2 (the point in time C in the fourth example) and the point in time 3 (the point in time D in the fourth example).

According to the sixth aspect, as described above in the fourth example, the frequency of input of the scraping toner pattern to the cleaning member and the margin for the back contamination are favorably balanced. Accordingly, the filming is favorably removed from the image bearer while the contamination of the back side of the recording medium is favorably prevented.

Now, a description is given of a seventh aspect.

In the image forming apparatus such as the copier 1 according to the fourth aspect, the control unit such as the control unit 90 causes the toner image pattern that is not transferred to the recording medium such as the sheet P to pass through the transfer nip at at least a point in time between the recording media (the point in time A in the fourth example) and the point in time 2 (the point in time C in the fourth example).

According to the seventh aspect, as described above in the fourth example, the frequency of input of the toner image pattern to the cleaning member such as the cleaning blade 31 is increased, allowing frequent input of a small amount of toner to the cleaning member. Such a configuration prevents the shortage of the toner staying at the cleaning area and allows the toner that is not impaired to stay at the cleaning area during the printing operation. Accordingly, the filming is favorably removed from the image bearer such as the intermediate transfer belt 17.

Now, a description is given of an eighth aspect.

In the image forming apparatus such as the copier 1 according to any one of the fourth to seventh aspects, the control unit such as the control unit 90 causes the toner image pattern that is not transferred to the recording medium such as the sheet P to pass through the transfer nip at all the points in time 1 to 4, a point in time between recording media, and a point in time other than during the image forming operation.

According to the eighth aspect, as described above in the fourth example, the frequency of input of the toner image pattern to the cleaning member such as the cleaning blade 31 is increased, allowing frequent input of a small amount of toner to the cleaning member. Such a configuration prevents the shortage of the toner staying at the cleaning area and allows the toner that is not impaired to stay at the cleaning area during the printing operation. Accordingly, the filming is favorably removed from the image bearer such as the intermediate transfer belt 17.

Now, a description is given of a ninth aspect.

In the image forming apparatus such as the copier 1 according to any one of the first to eighth aspects, in the cleaning operation, the control unit such as the control unit 90 forms an alternating electric field at the transfer nip such as the secondary transfer nip to move the extraneous matter adhering to the transfer member to the image bearer.

According to the ninth aspect, by the hopping effect as described above in the embodiment, the extraneous matter such as the toner adhering to the transfer member such as the secondary transfer roller 18 is favorably moved to the image bearer such as the intermediate transfer belt 17.

Now, a description is given of a tenth aspect.

In the image forming apparatus such as the copier 1 according to any one of the first to ninth aspects, the control unit such as the control unit 90 determines, based on a traveling distance of the image bearer such as the intermediate transfer belt 17, an amount of toner of the toner image pattern that is not transferred to the recording medium such as the sheet P.

According to the tenth aspect, as described above in the embodiment, the optimum amount of toner for the filming on the image bearer such as the intermediate transfer belt 17 is input to the cleaning member such as the cleaning blade 31. Accordingly, the filming is favorably removed from the image bearer while wasteful toner consumption is prevented.

Now, a description is given of an eleventh aspect.

The image forming apparatus such as the copier 1 according to any one of the first to tenth aspects further includes an image forming unit such as the image forming unit 10 that forms, based on a traveling distance of the image bearer such as the intermediate transfer belt 17, the toner image pattern that is not transferred to the recording medium.

According to the eleventh aspect, as described above in the embodiment, the toner is input to the cleaning member such as the cleaning blade 31 at the optimum point in time.

Accordingly, the filming is favorably removed from the image bearer while wasteful toner consumption is prevented.

Now, a description is given of a twelfth aspect.

In the image forming apparatus such as the copier 1 according to any one of the first to eleventh aspects, the control unit such as the control unit 90 determines, based on an image mode, an amount of toner of the toner image pattern that is not transferred to the recording medium. The image mode includes a color image mode in which the transfer member transfers a color toner image to the recording medium such as the sheet P and a monochrome image mode in which the transfer member transfers a black toner image alone to the recording medium.

According to the twelfth aspect, as described above in the embodiment, the optimum amount of toner is input to the cleaning member such as the cleaning blade 31 in consideration for the residual toner input to the cleaning member such as the cleaning blade 31 in the printing operation. Accordingly, the filming is favorably removed from the image bearer while wasteful toner consumption is prevented.

Now, a description is given of a thirteenth aspect.

The image forming apparatus such as the copier 1 according to any one of the first to twelfth aspects further includes an image forming unit such as the image forming unit 10 that forms, based on an image mode, the toner image pattern that is not transferred to the recording medium. The image mode includes a color image mode in which the transfer member transfers a color toner image to the recording medium such as the sheet P and a monochrome image mode in which the transfer member transfers a black toner image alone to the recording medium.

According to the thirteenth aspect, the optimum amount of toner is input to the cleaning member such as the cleaning blade 31 in consideration for the residual toner input to the cleaning member such as the cleaning blade 31 in the printing operation. Accordingly, the filming is favorably removed from the image bearer while wasteful toner consumption is prevented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

This patent application is based on and claims priority to Japanese Patent Application No. 2021-121595, filed on Jul. 26, 2021, in the Japan Patent Office, the entire disclosure of which is hereby incorporated by reference herein.

REFERENCE SIGNS LIST

1: copier
11: photoconductive drum
17: intermediate transfer belt
18: secondary transfer roller
18A: opposed roller
30: belt cleaning device
31: cleaning blade
P: sheet

The invention claimed is:

1. An image forming apparatus comprising:
an image bearer;
a transfer member configured to,
contact the image bearer to form a transfer nip, and
transfer a toner image on a surface of the image bearer to a recording medium at the transfer nip, the toner image corresponding to an image to be transferred to the recording medium;
a cleaning member configured to clean the surface of the image bearer; and
processing circuitry configured to, execute a cleaning operation to clean the transfer member, the cleaning operation consisting of moving extraneous matter adhering to the transfer member to the image bearer, and cause at least one scraping toner pattern, the at least one scraping toner pattern formed on the surface of the image bearer and input into the cleaning member, to pass through the transfer nip during the cleaning operation.

2. The image forming apparatus according to claim 1, wherein the processing circuitry is further configured to, in the cleaning operation, form an alternating electric field at the transfer nip to move the extraneous matter adhering to the transfer member to the image bearer.

3. The image forming apparatus according to claim 1, wherein the processing circuitry is further configured to determine, based on a traveling distance of the image bearer, an amount of toner of the at least one scraping toner pattern.

4. The image forming apparatus according to claim 1, further comprising:

an image forming device configured to form, based on a traveling distance of the image bearer, the at least one scraping toner pattern.

5. The image forming apparatus according to claim 1, wherein the processing circuitry is further configured to determine, based on an image mode, an amount of toner of the at least one scraping toner pattern; and the image mode includes, a color image mode during which the transfer member is configured to transfer a color toner image to the recording medium, and a monochrome image mode during which the transfer member is configured to transfer a black toner image alone to the recording medium.

6. The image forming apparatus according to claim 1, further comprising:

an image forming device configured to form, based on an image mode, the at least one scraping toner pattern, wherein the image mode includes:

a color image mode during which the transfer member is configured to transfer a color toner image to the recording medium; and a monochrome image mode during which the transfer member is configured to transfer a black toner image alone to the recording medium.

7. The image forming apparatus according to claim 1, wherein the processing circuitry is further configured to:

cause a transfer of the at least one scraping toner pattern to a position on the surface of the image bearer in front of the toner image in a sheet conveyance direction.

8. The image forming apparatus according to claim 1, wherein the processing circuitry is further configured to:

cause a transfer of the at least one scraping toner pattern to a position on the surface of the image bearer behind the toner image in a sheet conveyance direction.

9. The image forming apparatus according to claim 1, wherein the processing circuitry is further configured to:

cause a transfer of the at least one scraping toner pattern to a position on the surface of the image bearer above the toner image in a direction perpendicular to a sheet conveyance direction.

10. The image forming apparatus according to claim 1, wherein the processing circuitry is further configured to:

cause a transfer of the at least one scraping toner pattern to a position on the surface of the image bearer below the toner image in a direction perpendicular to a sheet conveyance direction.

11. The image forming apparatus according to claim 1, wherein the processing circuitry is further configured to:

cause a transfer of the at least one scraping toner pattern to a position on the surface of the image bearer behind a final toner image of a plurality of toner images corresponding to a plurality of continuously conveyed recording media.

12. The image forming apparatus according to claim 1, wherein a width of the at least one scraping toner pattern is longer at a center and at both edges of the at least one scraping toner pattern in a width-wise direction of the image bearer than in other portions of the at least one scraping toner pattern.

13. The image forming apparatus according to claim 1, wherein a width of the at least one scraping toner pattern is constant in a width-wise direction of the image bearer.

14. An image forming apparatus comprising:

an image bearer;

a transfer member configured to, contact the image bearer to form a transfer nip, and transfer a toner image on a surface of the image bearer to a recording medium at the transfer nip, the toner image corresponding to an image to be transferred to the recording medium;

a cleaning member configured to clean the surface of the image bearer; and processing circuitry configured to execute at least one image forming operation of forming the image on the recording medium, the at least one image forming operation including at least one of, a pre-sheet-passage cleaning operation to clean the transfer member before a first recording medium of a plurality of continuously conveyed recording media reaches the transfer nip, the pre-sheet-passage cleaning operation consisting of moving extraneous matter adhering to the transfer member to the image bearer, and a post-sheet-passage cleaning operation to clean the transfer member after a last recording medium of the plurality of continuously conveyed recording media passes through the transfer nip, the post-sheet-passage cleaning operation consisting of moving the extraneous matter adhering to the transfer member to the image bearer, the processing circuitry being further configured to cause at least one scraping toner pattern to pass through the transfer nip during at least one of points in time 1 to 2 during the at least one image forming operation, the point in time 1 being during the pre-sheet-passage cleaning operation, and the point in time 2 being during the post-sheet-passage cleaning operation.

15. The image forming apparatus according to claim 14, wherein the at least one scraping toner pattern is a plurality of scraping toner patterns; and the processing circuitry is further configured to cause the plurality of scraping toner patterns to pass through the transfer nip during at least the point in time 1 and a point in time other than during the at least one image forming operation.

16. The image forming apparatus according to claim 14, wherein the at least one scraping toner pattern is a plurality of scraping toner patterns; and the processing circuitry is further configured to cause the plurality of scraping toner patterns to pass through the transfer nip during at least the point in time 1 and the point in time 2.

17. The image forming apparatus according to claim 14, wherein the at least one scraping toner pattern is a plurality of scraping toner patterns; and the processing circuitry is further configured to cause the plurality of scraping toner patterns to pass through the transfer nip during at least a point in time between the plurality of continuously conveyed recording media reaching the transfer nip and the point in time 1.

18. The image forming apparatus according to claim 14, wherein the at least one scraping toner pattern is a plurality of scraping toner patterns; and the processing circuitry is further configured to cause the plurality of scraping toner patterns to pass through the transfer nip at the points in time 1 to 2, a point in time between the plurality of continuously conveyed recording media reaching the transfer nip, and a point in time other than during the at least one image forming operation.

* * * * *